(12) United States Patent
Vehr

(10) Patent No.: US 8,636,463 B2
(45) Date of Patent: Jan. 28, 2014

(54) INTERIOR COOLING CHANNELS

(75) Inventor: James William Vehr, Easley, SC (US)

(73) Assignee: General Electric Company, Schenectady, NY (US)

( * ) Notice: Subject to any disclaimer, the term of this patent is extended or adjusted under 35 U.S.C. 154(b) by 873 days.

(21) Appl. No.: 12/751,398

(22) Filed: Mar. 31, 2010

(65) Prior Publication Data

US 2011/0243711 A1    Oct. 6, 2011

(51) Int. Cl.
*F01D 9/06* (2006.01)
*F01D 5/18* (2006.01)
*F01D 11/08* (2006.01)

(52) U.S. Cl.
USPC ........ 415/115; 415/173.1; 415/175; 415/176; 415/178; 416/90 R; 416/92; 416/96 R; 416/97 R; 60/754

(58) Field of Classification Search
USPC ....... 415/115, 173.1, 175–178; 416/90 R, 92, 416/96 R, 96 A, 97 R; 60/752–760
See application file for complete search history.

(56) References Cited

U.S. PATENT DOCUMENTS

| | | | |
|---|---|---|---|
| 2,888,243 A * | 5/1959 | Pollock | 416/92 |
| 2,972,805 A * | 2/1961 | Hignett et al. | 416/92 |
| 3,620,643 A * | 11/1971 | Jones | 416/90 R |
| 3,806,274 A * | 4/1974 | Moore | 416/97 R |
| 5,328,331 A | 7/1994 | Bunker et al. | |
| 5,660,525 A | 8/1997 | Lee et al. | |
| 6,582,584 B2 * | 6/2003 | Lee et al. | 416/97 R |
| 6,695,582 B2 | 2/2004 | Bunker et al. | |
| 2005/0135932 A1 * | 6/2005 | Dodd | 416/97 R |

* cited by examiner

*Primary Examiner* — Christopher Verdier
(74) *Attorney, Agent, or Firm* — Mark E. Henderson; Ernest G. Cusick; Frank A. Landgraff

(57) ABSTRACT

Cooling channels through the interior of a machine component that include: a first set of cooling channels, the first set of cooling channels including a plurality of parallel channels that reside in a first plane; a second set of cooling channels, the second set of cooling channels including a plurality of parallel channels that reside in a second plane. Along a longitudinal axis, the cooling channels of the first and second set of cooling channels may include an alternating diverging-converging configuration, the alternating diverging-converging configuration creating a series of broader chamber sections connected by a series of narrower throat sections. The first set of cooling channels and the second set of cooling channels may be configured such that, when viewed from the side, a crisscrossing pattern with a plurality of intersections is formed. The first plane resides in spaced relation to the second plane, with the first plane being offset from the second plane such that a plurality of the chamber sections of the first set of cooling channels connect to a plurality of the chamber sections of the second set of cooling channels.

21 Claims, 10 Drawing Sheets

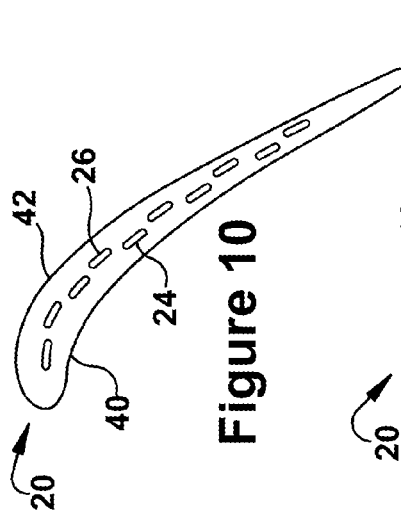
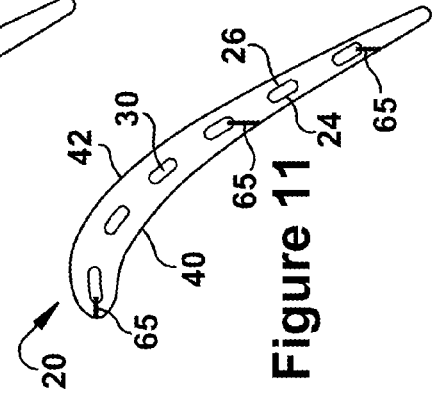
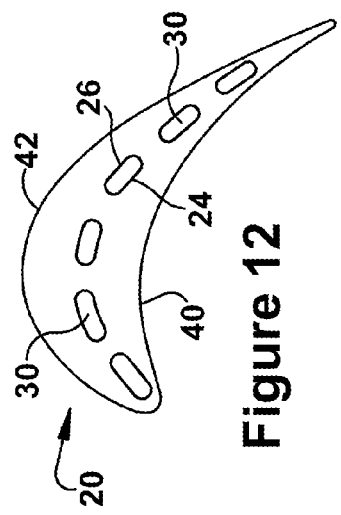
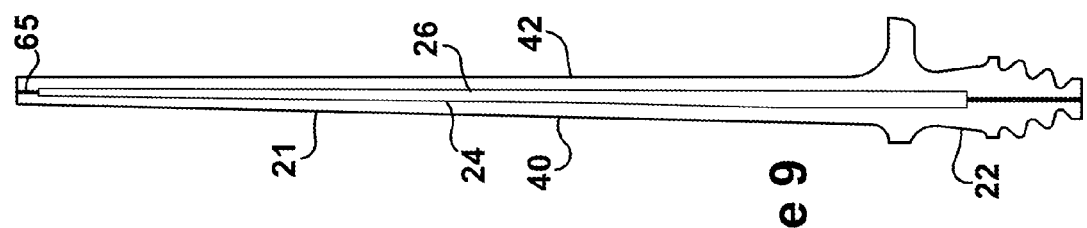
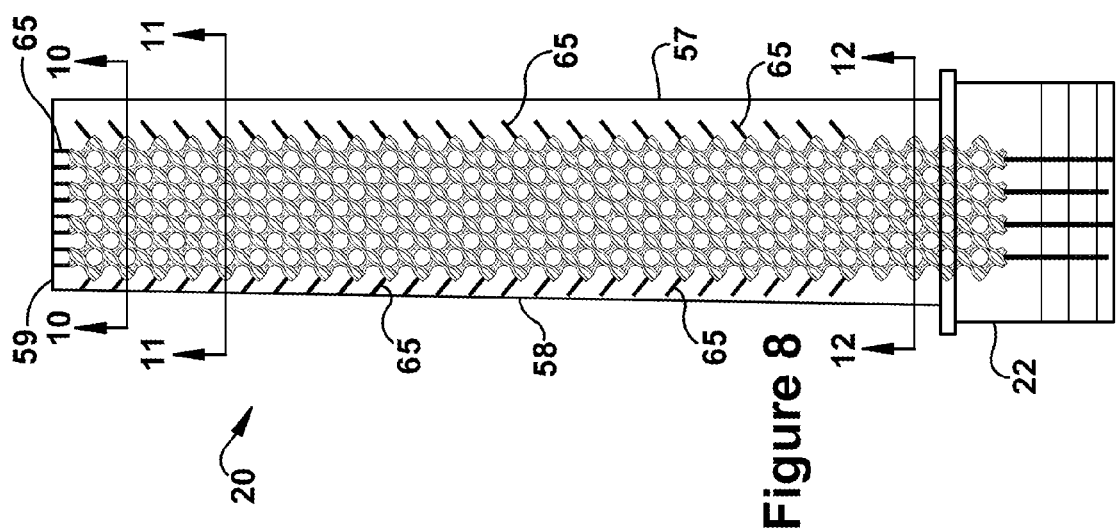

INTERIOR COOLING CHANNELS

BACKGROUND OF THE INVENTION

This present application relates generally to interior cooling channels formed to cool components in industrial machinery that operate at high temperatures. More specifically, but not by way of limitation, the present application relates to interior cooling channels formed in thin wall applications that provide effective cooling while maintaining the structural integrity of the wall.

As provided below, the invention of the present application is described in relation to exemplary applications within a combustion turbine engine. It will be appreciated by those of ordinary skill in the art that, while the present invention is well-suited to this particular type of application, it is not so limited. Other applications in other types of high-temperature industrial engines or machines are possible.

To continue with the exemplary usage within a combustion turbine engine, it will be appreciated that these engines generally include a compressor, combustor, and turbine. The compressor and turbine sections generally include rows of blades that are axially stacked in stages. Each stage includes a row of circumferentially-spaced stator blades, which are fixed, and a row of rotor blades, which rotate about a central turbine axis or shaft. In operation, generally, the compressor rotor blades rotate about the shaft, and, acting in concert with the stator blades, compress a flow of air. The supply of compressed air then is used in the combustor to combust a supply of fuel. The resulting flow of hot expanding gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft.

In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, turbine blades, which, as described, generally include both the rotating rotor blades and the fixed, circumferentially-spaced stator blades, become highly stressed with extreme mechanical and thermal loads.

The ever-increasing demand for energy makes the objective of engineering more efficient combustion turbine engines an ongoing and significant one. While several strategies for increasing the efficiency of turbine engines are known, it remains a challenging objective because these alternatives, which, for example, include increasing the size of the engine, increasing the temperatures through the hot-gas path, and increasing the rotational velocities of the rotor blades, generally place additional strain on parts that are already highly stressed, for example, turbine rotor and stator blades. As a result, improved apparatus, methods and/or systems that reduce operational stresses placed on turbine blades or allow the turbine blades to better withstand these stresses are in great demand.

As one of ordinary skill in the art will appreciate, one strategy for alleviating the thermal stress on the blades is through cooling them during operation. Effective cooling, for example, may allow the blades to withstand higher firing temperatures, withstand greater mechanical stresses at high operating temperatures, and/or extend the part-life of the blades, all of which may allow the turbine engine to be more cost-effective and efficient in its operation. One way to cool blades during operation is through the use of internal cooling passageways or circuits. Generally, this involves passing a relatively cool supply of compressed air, which may be supplied by the compressor of the turbine engine, through internal cooling channels within the blades. As the compressed air passes through the blade, it convectively cools the blade, which allows the part to withstand firing temperatures that it otherwise could not.

For a number of reasons, it will be appreciated that great care is required in designing and manufacturing the configuration of these cooling channels. First, the use of cooling air comes at a price. That is, air that is diverted from the compressor to the turbine section of the engine for cooling bypasses the combustor and, thus, decreases the efficiency of the engine. As such, cooling passages must be designed to use air in a highly effective manner, i.e., provide the necessary coverage and cooling efficiency, so that a minimum amount of air is needed for this purpose. Second, newer, more aggressively shaped aerodynamic blade configurations are thinner and more curved, which often rules out the usage of linear cooling channels that stretch the length of the turbine blade. The thinness of the blade requires the cooling passages to perform well while having a compact design. Third, to reduce mechanical loads, cooling passages should be formed to remove unnecessary weight from the blade; however, the blades still must remain strong to withstand the large mechanical loads. Cooling channels, therefore, must be designed such that the turbine blade has a lightweight but strong construction, while stress concentrations that would negatively affect the blades resilience are avoided. In short, what is needed is a turbine blade cooling configuration that performs well in more aggressively shaped, thinner aerodynamic blade configurations, promotes lighter blade internal construction, maintains the structural support of the turbine blade, and delivers high cooling effectiveness.

BRIEF DESCRIPTION OF THE INVENTION

The present application thus describes cooling channels through the interior of a machine component that include: a first set of cooling channels, the first set of cooling channels including a plurality of parallel channels that reside in a first plane; a second set of cooling channels, the second set of cooling channels including a plurality of parallel channels that reside in a second plane. Along a longitudinal axis, the cooling channels of the first and second set of cooling channels may include an alternating diverging-converging configuration, the alternating diverging-converging configuration creating a series of broader chamber sections connected by a series of narrower throat sections. The first set of cooling channels and the second set of cooling channels may be configured such that, when viewed from the side, a crisscrossing pattern with a plurality of intersections is formed. The first plane resides in spaced relation to the second plane, with the first plane being offset from the second plane such that a plurality of the chamber sections of the first set of cooling channels connect to a plurality of the chamber sections of the second set of cooling channels.

In some embodiments, the machine component may be a component within a combustion turbine engine, such as a turbine rotor blade, a turbine stator blade, a stationary shroud, a combustor liner, or a combustor transition piece.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 8 is a side view of a turbine rotor blade with a cutaway showing cooling channels with an alternative configuration according to an embodiment of the present invention;

FIG. 9 is a profile view of the cooling channels of FIG. 8;

FIG. 10 is a section view along 10-10 of FIG. 8;

FIG. 11 is a section view along 11-11 of FIG. 8;

FIG. 12 is a section view along 12-12 of FIG. 8;

DETAILED DESCRIPTION OF THE INVENTION

Figure 1:
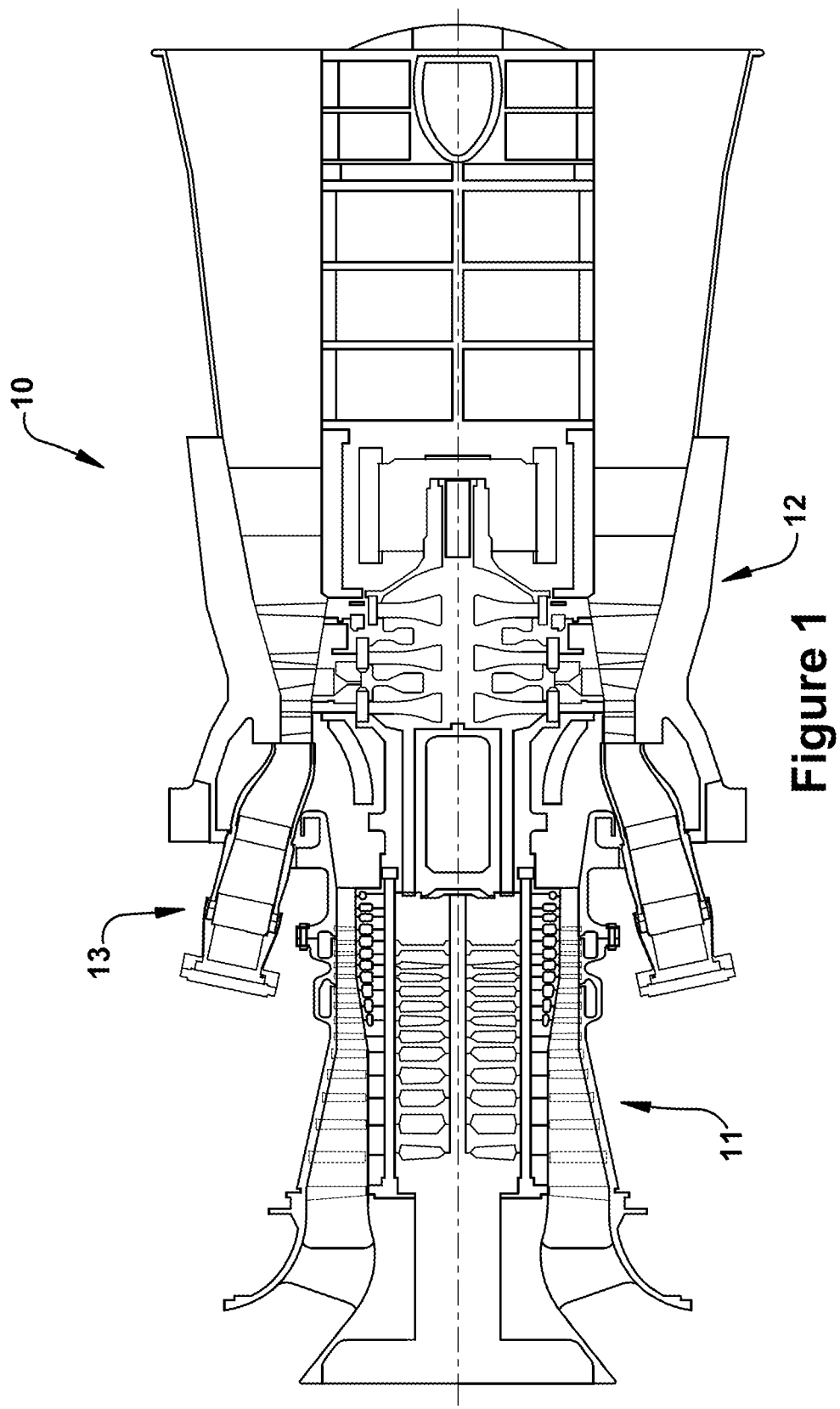
FIG. 1 is a schematic representation of an exemplary turbine engine in which certain embodiments of the present application may be used.

As an initial matter, in describing the invention of the current application, it may be necessary to select terminology that refers to and describes certain parts or machine components of a turbine engine and related systems. Whenever possible, industry terminology will be used and employed in a manner consistent with its accepted meaning. However, it is generally meant that such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component, as provided herein.

In addition, several descriptive terms may be used regularly herein, and it may be helpful to define these terms at this point. These terms and their definition given their usage herein is as follows. The term "rotor blade", without further specificity, is a reference to the rotating blades of either the compressor or the turbine, which include both compressor rotor blades and turbine rotor blades. The term "stator blade", without further specificity, is a reference the stationary blades of either the compressor or the turbine, which include both compressor stator blades and turbine stator blades. The term "blades" will be used herein to refer to either type of blade. Thus, without further specificity, the term "blades" is inclusive to all type of turbine engine blades, including compressor rotor blades, compressor stator blades, turbine rotor blades, and turbine stator blades. Further, as used herein, "downstream" and "upstream", as well as "forward" and "aft", are terms that indicate a direction relative to the flow of working fluid through the turbine. As such, the term "downstream" refers to a direction that generally corresponds to the direction of the flow of working fluid, and the term "upstream" or "forward" generally refers to the direction that is opposite of the direction of flow of working fluid. The terms "trailing" or "aft" and "leading" or "forward" generally refer to relative position in relation to the flow of working fluid. At times, which will be clear given the description provided, the terms "trailing" and "leading" may refer to the direction of rotation for rotating parts. When this is the case, the "leading edge" of a rotating part is the front or forward edge given the direction that the part is rotating and, the "trailing edge" of a rotating part is the aft or rearward edge given the direction that the part is rotating.

The term "radial" refers to movement or position perpendicular to an axis. It is often required to described parts that are at differing radial positions with regard to an axis. In this case, if a first component resides closer to the axis than a second component, it may be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis.

Figure 2:
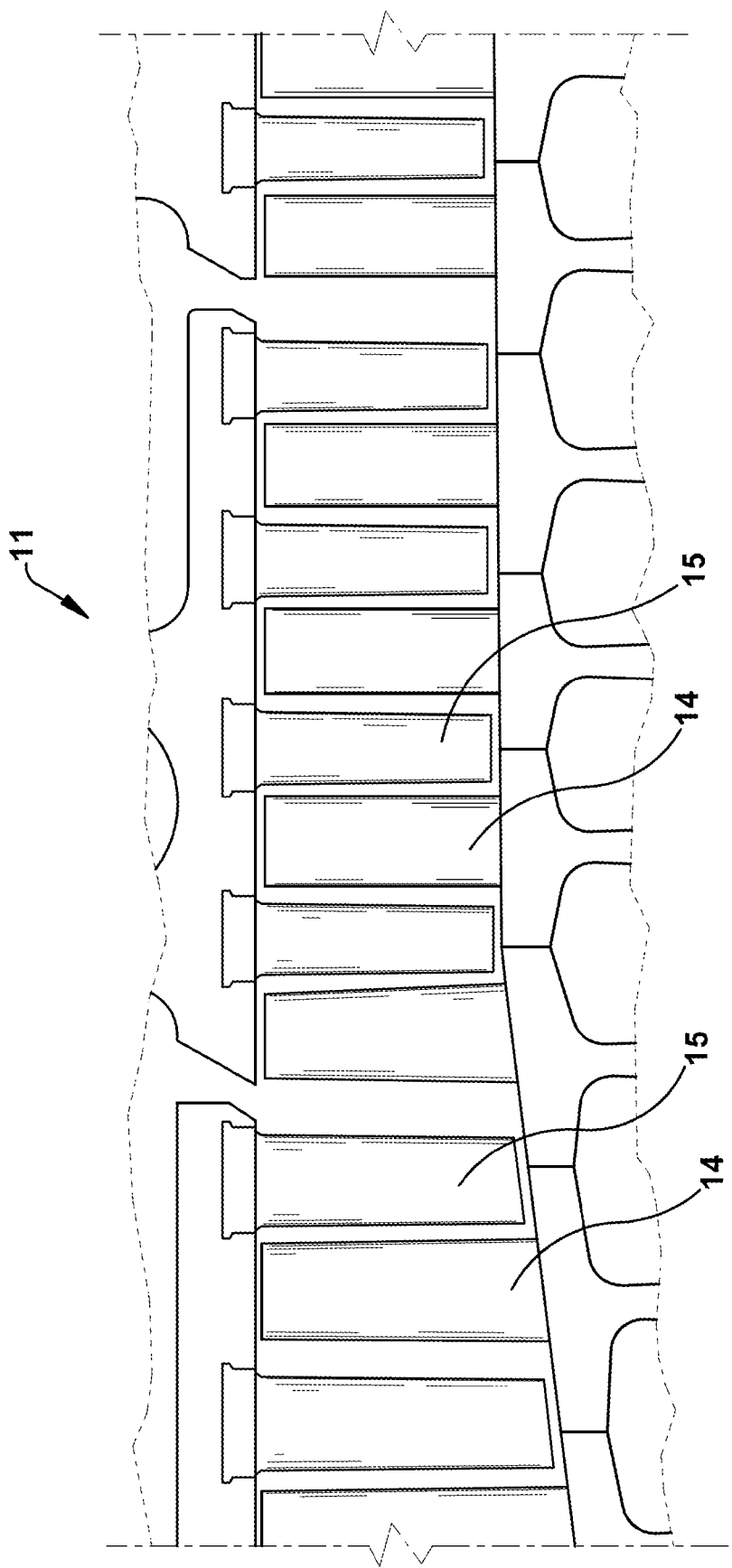
FIG. 2 is a sectional view of the compressor section of the combustion turbine engine of FIG. 1.
Figure 3:
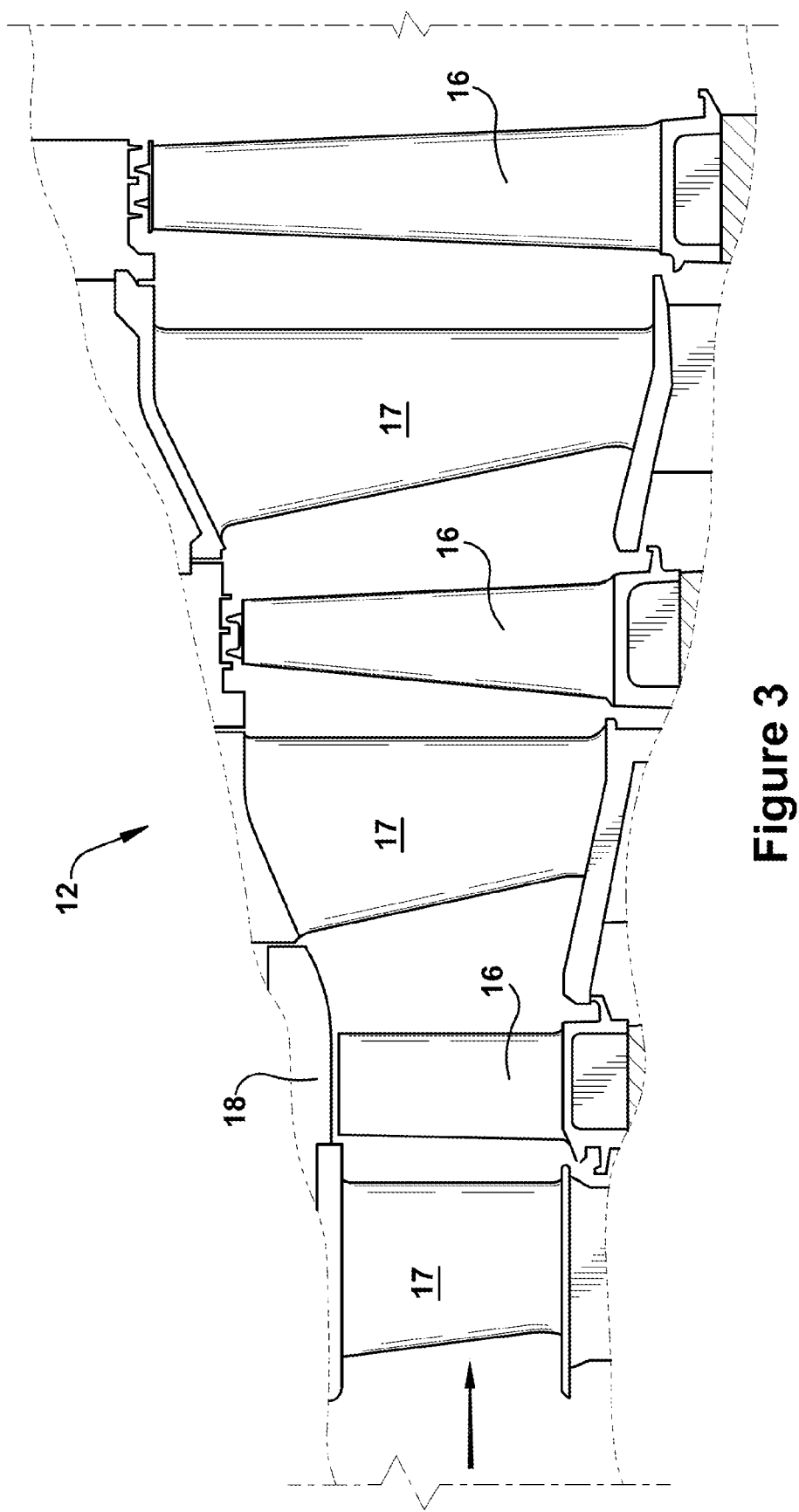
FIG. 3 is a sectional view of the turbine section of the combustion turbine engine of FIG. 1.

By way of background, referring now to the figures, FIGS. 1 through 3 illustrate an exemplary combustion turbine engine in which embodiments of the present application may be used. It will be understood by those skilled in the art that the present invention is not limited to this type of usage. As stated, the present invention may be used in combustion turbine engines, such as the engines used in power generation and airplanes, steam turbine engines, other type of rotary engines, as well as, other types of industrial machinery. FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 11, and a combustor 13 positioned between the compressor 11 and the turbine 12.

FIG. 2 illustrates a view of an exemplary multi-staged axial compressor 11 that may be used in the combustion turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation. The compressor stator blades 15 generally are circumferentially spaced one from the other and fixed about the axis of rotation. The compressor rotor blades 14 are circumferentially spaced and attached to the shaft; when the shaft rotates during operation, the compressor rotor blades 14 rotate about it. As one of ordinary skill in the art will appreciate, the compressor rotor blades 14 are configured such that, when spun about the shaft, they impart kinetic energy to the air or fluid flowing through the compressor 11. The compressor 11 may have other stages beyond the stages that are illustrated in FIG. 2. Additional stages may include a plurality of circumferential spaced compressor rotor blades 14 followed by a plurality of circumferentially spaced compressor stator blades 15.

FIG. 3 illustrates a partial view of an exemplary turbine section or turbine 12 that may be used in the combustion turbine engine of FIG. 1. The turbine 12 also may include a plurality of stages. Three exemplary stages are illustrated, but more or less stages may present in the turbine 12. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 12 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot-gas path of the turbine 12. The direction of flow of the hot gases through the hot-gas path is indicated by the arrow. As one of ordinary skill in the art will appreciate, the turbine 12 may have other stages beyond the stages that are illustrated in FIG. 3. Each additional stage may include a row of turbine stator blades 17 followed by a row of turbine rotor blades 16. As indicated, outboard of a rotor blade 16, a stationary shroud 18 may be positioned.

In use, the rotation of compressor rotor blades 14 within the axial compressor 11 may compress a flow of air. In the combustor 13, energy may be released when the compressed air is mixed with a fuel and ignited. The resulting flow of hot gases from the combustor 13, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

FIGS. 4 through 19 illustrate configurations of cooling channels for turbine blades and other turbine engine components according to an exemplary embodiment of the present application. The present invention may be used in any turbine engine application, including, for example, within turbine rotor blades, turbine stator blades, stationary shrouds, or the liners and transition pieces within the combustor. It will be appreciated that FIGS. 4, 8, 13 and 15 show a side view of a turbine blade 20 that includes cooling channels 24, 26 according to the present invention. As used herein, a "side view" is the perspective of the cooling channels as shown in these figures, with a "profile view" being the perspective presented in FIGS. 5 and 9. Also, the blade 20 is shown as a turbine rotor blade; however, it will be appreciated that the present invention also may be applied to turbine stator blades 17 as well as other parts exposed to the high temperatures within the combustion turbine engine, such as a stationary shroud 18. The turbine blade 20, it will be appreciated, may include an airfoil 21, which interacts with the flow of hot gases through the turbine section 12 of the engine, and a shank 22, which may be used to connect the turbine blade 20 to a rotor disc (not shown).

The cooling channels of the present invention generally include a first set of cooling channels 24 and a second set of cooling channels 26. The first set of cooling channels 24 may include channels configured to carry a coolant. The channels of the first set of cooling channels 24 generally extend diagonally from an inner radial/leading edge position to an outer radial/trailing edge position. The second set of cooling channels may include channels configured to carry a coolant. The channels of the second set of cooling channels 26 generally extend diagonally from an inner radial/trailing edge position to an outer radial/leading edge position. The first set of cooling channels 24 and the second set of cooling channels 26 may be configured so that, when viewed from the side, the longitudinal axes of the first set of cooling channels 24 are approximately perpendicular to the longitudinal axes of the second set of cooling channels 26. In one embodiment and shown, the first set of cooling channels 24 and the second set of cooling channels 26 form a general crisscrossing pattern.

The first set of cooling channels 24 and the second set of cooling channels 26 may reside in approximately parallel planes. The first set of cooling channels 24 may include a plurality of parallel channels that reside in a first plane. The second set of cooling channels 26 may include a plurality of parallel channels that reside in a second plane. Along a longitudinal axis, the cooling channels of the first set of cooling channels 24 may have an alternating diverging-converging configuration. Likewise, along a longitudinal axis, the cooling channels of the second set of cooling channels 26 may have an alternating diverging-converging configuration. As shown more clearly in FIGS. 8 and 13, 14 and 15, the alternating diverging-converging configuration generally forms a series of chamber sections 30 connected by throat sections 32 that are positioned therebetween. The chamber sections 30 comprise channels of greater cross-sectional area than the throat sections 32. The throat sections 32 may include a converging section that narrows to a minimum throat area 44 followed by a diverging section that broadens from the minimum throat area and which connects to the adjoining chamber section 30. From there, the chamber section 30 may include a diverging section that broadens from its connection with the throat section 32 to a maximum chamber area 46. The chamber section 32 then may have a converging section that narrows from the maximum chamber area 46. The diverging section and the converging section of both the throat sections 32 and the chamber sections 30 may be formed with a smooth contour. The smooth, rounded contours of the present invention prevent sizable stress concentrations from occurring when the part is in use.

It has been discovered that certain ratios between the minimum throat area 44 and a maximum chamber area 46 promote good performance. Preferably, in some embodiments, the minimum throat area 44 and the maximum chamber area 46 are configured such that a cross-sectional area of the minimum throat area 44 comprises a range of between about 0.8 to 0.2 of a cross-sectional area of the maximum chamber area 46. More preferably, in some embodiments, the minimum throat area 44 and the maximum chamber area 46 are configured such that a cross-sectional area of the minimum throat area 44 comprises a range of about 0.6 to 0.4 of a cross-sectional area of the maximum chamber area 46. It will be appreciated, in usage, the narrowing throat sections 32 increase the velocity of the coolant flowing through the cooling channels 24, 26 and, thereby, enhance the cooling effectiveness of the coolant.

As stated, the first set of cooling channels 24 and the second set of cooling channels 26 are configured such that, when viewed from the side, a crisscrossing pattern is formed. This crisscrossing pattern includes a plurality of intersections 36. The intersections 36, as used herein, are the areas of overlap that occurs when the cooling channel pattern is viewed from the side. Within these areas of overlap, the first set of cooling channels 24 may connect with the second set of cooling channels 26 (i.e., the first set of cooling channels 24 may be in fluid communication with the second set of cooling channels 26). The first plane (of the first set of cooling channels 24) generally resides in spaced relation to the second plane (of the second set of cooling channels 26). The first plane may be offset a predetermined or desired distance from the second plane such that a plurality of the chamber sections 30 of the first set of cooling channels 24 connect to a plurality of the chamber sections 30 of the second set of cooling channels 26. These connections are most easily viewed in FIG. 14.

The alternating diverging-converging configuration of the first set of cooling channels 24 and the second set of cooling channels 26 may include regular spaced, i.e., the distance between neighboring chamber sections 30 along the same cooling channel is substantially regular or the same distance. Likewise, the distance between neighboring throat sections 32 along the same cooling channel is substantially regular or those same distance. The regular spacing for the first set of cooling channels 24 and the second set of cooling channels 26 may be approximately the same. In this manner, it will be appreciated that the first set of cooling channels 24 and a second set of cooling channels 26 may be configured such that the chamber sections 30 overlap. Given this overlap, the chamber sections 30 may be configured along with the offset between the first plane and the second plane such that the chambers 30 connect.

Figure 5:
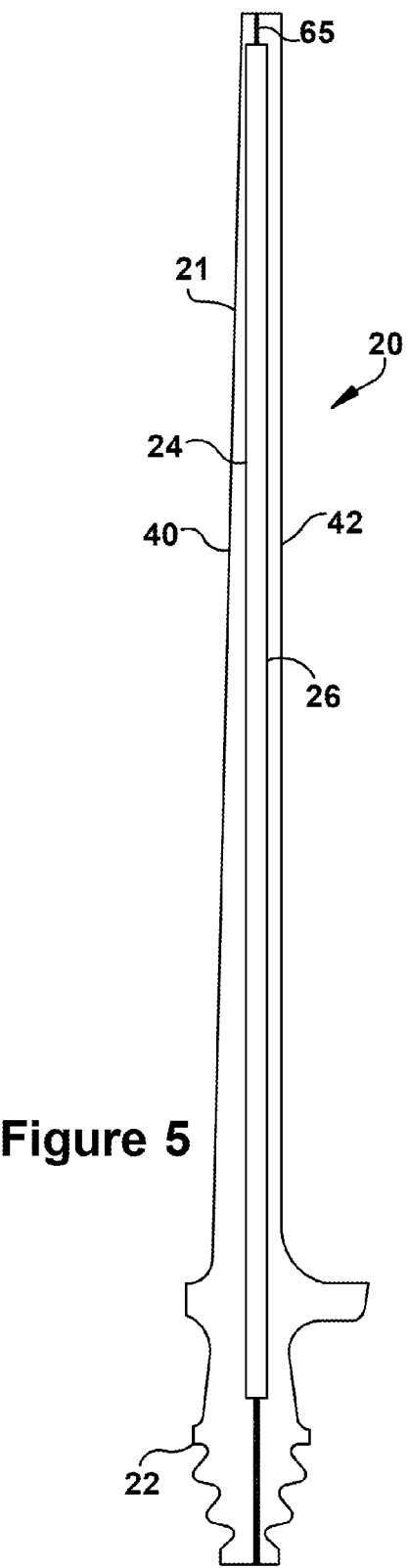
FIG. 5 is a profile view of the cooling channels of FIG. 4.
Figure 6:
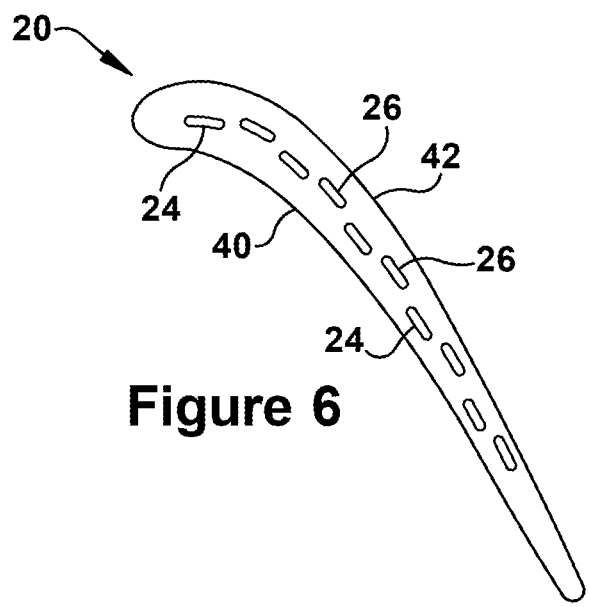
FIG. 6 is a section view along 6-6 of FIG. 4.
Figure 7:
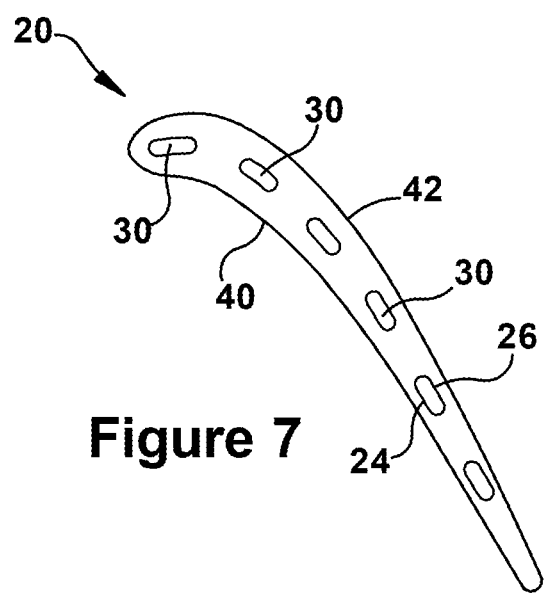
FIG. 7 is a section view along 7-7 of FIG. 4.
Figure 17:
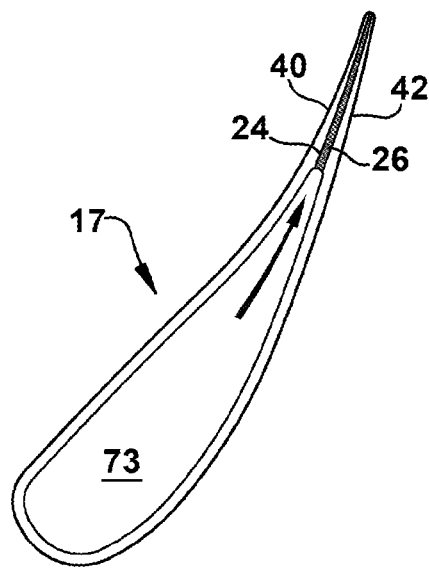
FIG. 17 is a profile view of cooling channels according to an embodiment of the present application as the cooling channels might be positioned in usage within a hollow turbine stator blade of a combustion turbine engine.
Figure 19:
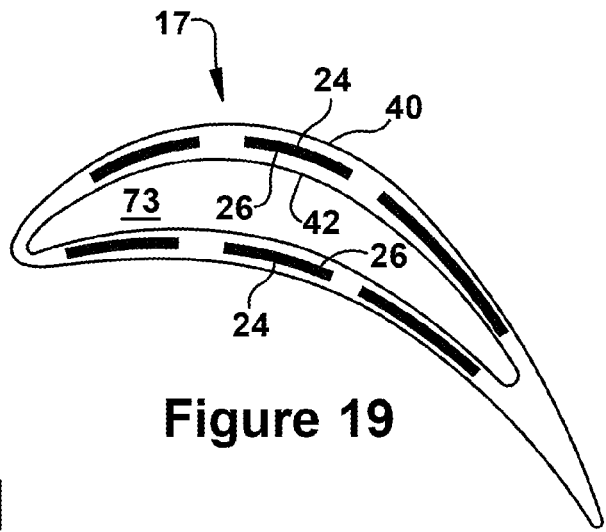
FIG. 19 is a profile view of cooling channels according to an embodiment of the present application as the cooling channels might be positioned in usage within the sidewalls of a hollow turbine stator blade.
Figure 18:
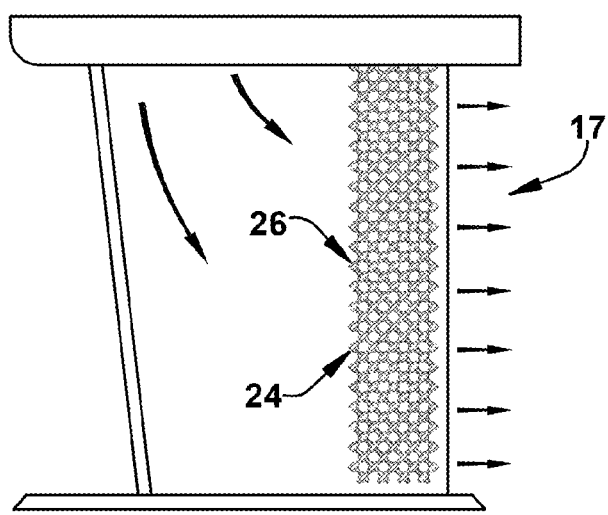
FIG. 18 is a side view of the cooling channels of FIG. 17.

As shown most clearly in FIG. 5, the first set of cooling channels 24 may reside in close proximity to a first surface 40 of the turbine blade 20; and the second set of cooling channels 26 may reside in close proximity to a second surface 42 of the turbine blade 20. The first plane may reside in spaced relation to the first surface 40 of the turbine blade 20 and the second plane may reside in spaced relation to the second surface 42 of the turbine blade 20. In some embodiments, the first surface 40 may be the pressure side of the airfoil and the second surface 42 may be the suction side of the airfoil 21 of a turbine blade 20. It will be appreciated that, in some embodiments, the first surface 40 may be the exterior surface of a turbine blade and the second surface may be the interior surface of the turbine blade. This type of embodiment may occur in turbine blades having a hollow central cavity surrounded by thin outer walls, an example of which is shown in FIGS. 17, 18 and 19.

As illustrated in FIG. 5, the width of the profile of the cooling channels 24, 26 may be relative constant as the cooling channels 24, 26 extend radially outward along the rotor blade 20. As provided in FIGS. 8 through 12, the width of the profile of the cooling channels 24, 26 may vary. As shown, in one preferred embodiment, the width of the profile of the cooling channels 24, 26 narrows as the cooling channels extend outward. This narrowing may be in proportion with the narrowing of the rotor blade 20 so that the distance that cooling channels 24, 26 are from the surface of the rotor blade 20 remains somewhat constant.

In some embodiments, the first set of cooling channels 24 may include an exterior side that faces the first surface 40 and an interior side that faces the second set of cooling channels 26. Similarly, the second set of cooling channels 26 may include an exterior side that faces outward toward the second surface 42 and an interior side that faces toward the first set of cooling channels 24. It will be appreciated that the chamber sections 30 of the first set of cooling channels 24 connect to the chamber sections 30 of the second set of cooling channels 26 along the interior sides of the chamber sections 30 of the first set of cooling channels 24 and the interior sides of the chamber sections 30 of the second set of cooling channels 26.

Figure 13:
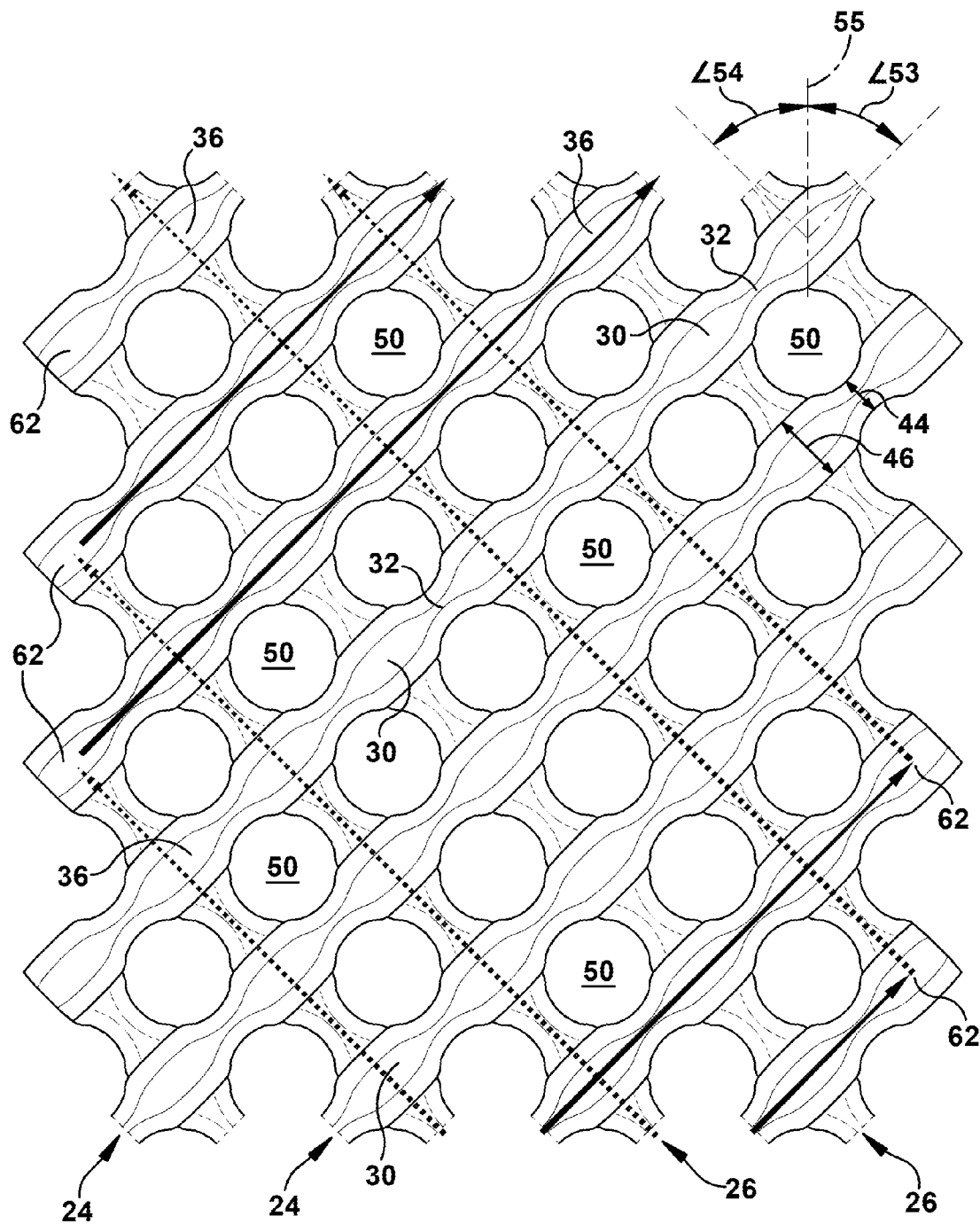
FIG. 13 is an enlarged side view of cooling channels according to an exemplary embodiment of the present invention.
Figure 14:
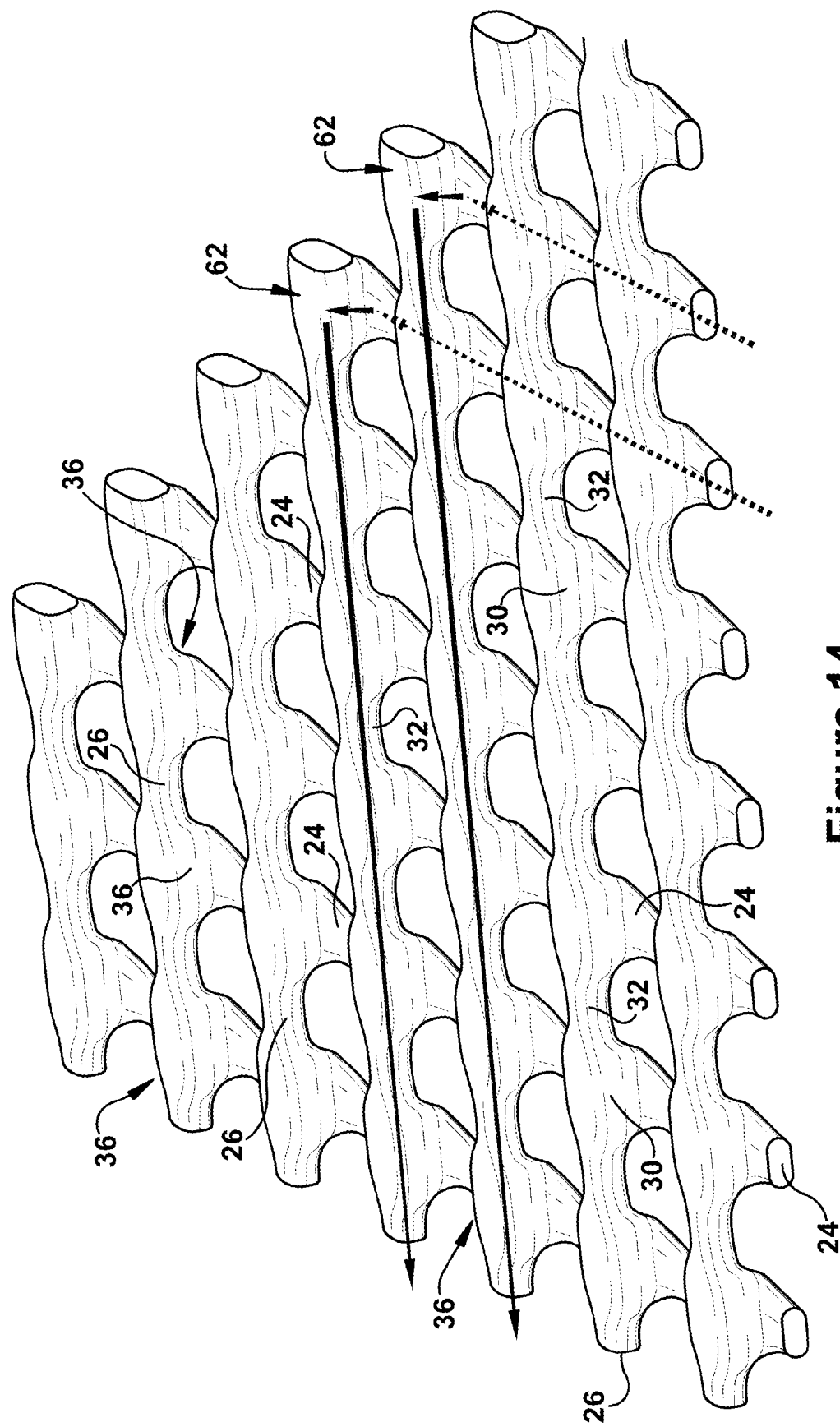
FIG. 14 is a perspective view of cooling channels according to an exemplary embodiment of the present invention.
Figure 15:
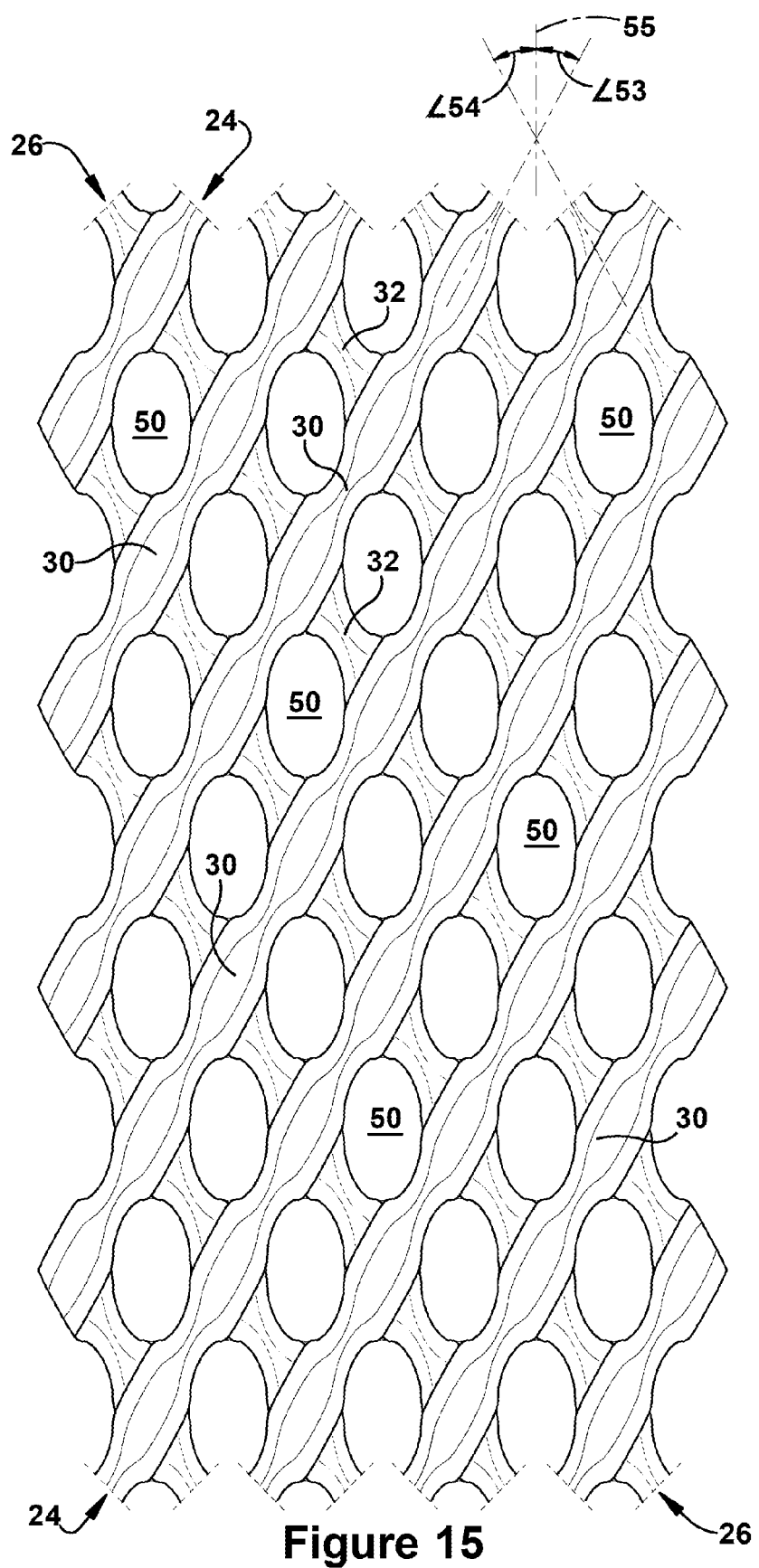
FIG. 15 is an enlarged side view of cooling channels according to an exemplary embodiment of the present invention.

As best shown in the side views of the FIGS. 13 and 15, in some embodiments, the crisscrossing pattern of the first set and second set of cooling channels 24, 26 may be configured such that a plurality of solid regions 50 are formed. Given the repeating crisscrossing pattern of the cooling channels 24, 26, the solid regions 50 may be disposed in a regular, repeating pattern such that, as shown, the solid regions 50 occur in areas situated between four neighboring or surrounding intersections 36. Given the different planes of the sets of cooling channels 24, 26, the solid regions 50 generally extend approximately perpendicular to the first plane and second plane. The solid regions 50 also may be described as the area of solid material around which the cooling channels 24, 26 are formed.

In a preferred embodiment, the solid regions 50, when viewed from the side, are approximately circular in shape. In this case, the solid regions 50 include an approximate cylinder shape as the solid regions 50 extend through the first plane and the second plane. In a preferred embodiment, when viewed from the side, the circular shape of the solid region 50 forms the contour of the converging sections and the diverging sections of the throat sections 32 that connect the chamber sections 30 of the four intersections 36 that surround the particular solid region 50. As shown in FIG. 15, the solid region 50 may be oval or elliptical in shape. In one preferred embodiment, the oval or ellipse shape of the solid region 50 is configured so that the major or long axis is substantially aligned with the blade span reference line 55. It will be appreciated that this orientation aligns the oval or elliptical shape of the solid region 50 to best withstand the large mechanical load that is applied by the working fluid against the blade during usage (i.e., the high velocity flow of working fluid that strikes the blade from a direction that is substantially perpendicular to the blade span reference line 55).

As shown in FIGS. 13 and 15, the first set of cooling channels 24 are disposed at a first angle 53 with respect to a blade span reference line 55, and the second set of cooling channels 26 are disposed at a second angle 54 with respect to the blade span reference line 55. In some embodiments, the first angle 53 and the second angle 54 may be configured to form a desired crisscrossing pattern. In preferred embodiments, the first angle 53 has a range from about 25 degrees to about 65 degrees, and the second angle 54 has a range from about −25 to about −65 degrees. In more preferred embodiments, the first angle has a range from about 35 degrees to about 55 degrees, and the second angle has a range from about −35 to about −55 degrees. In some ideal embodiments, the first angle 53 has a value of about 45 degrees, and the second angle 54 has a value of about −45 degrees. Of course, the values for the first angle 53 in the second angle 54 may be reversed such that other preferred embodiments are formed. Accordingly, in some preferred embodiments, the first angle 53 has a range from about −25 degrees to about −65 degrees, and the second angle 54 has a range from about 25 to about 65 degrees. In some more preferred embodiments, the first angle 53 has a range from about −35 degrees to about −55 degrees, and the second angle 54 has a range from about 35 to about 55 degrees. And, one ideal embodiment, the first angle 53 has a value of about −45 degrees, and the second angle 54 has a value of about 45 degrees.

Figure 4:
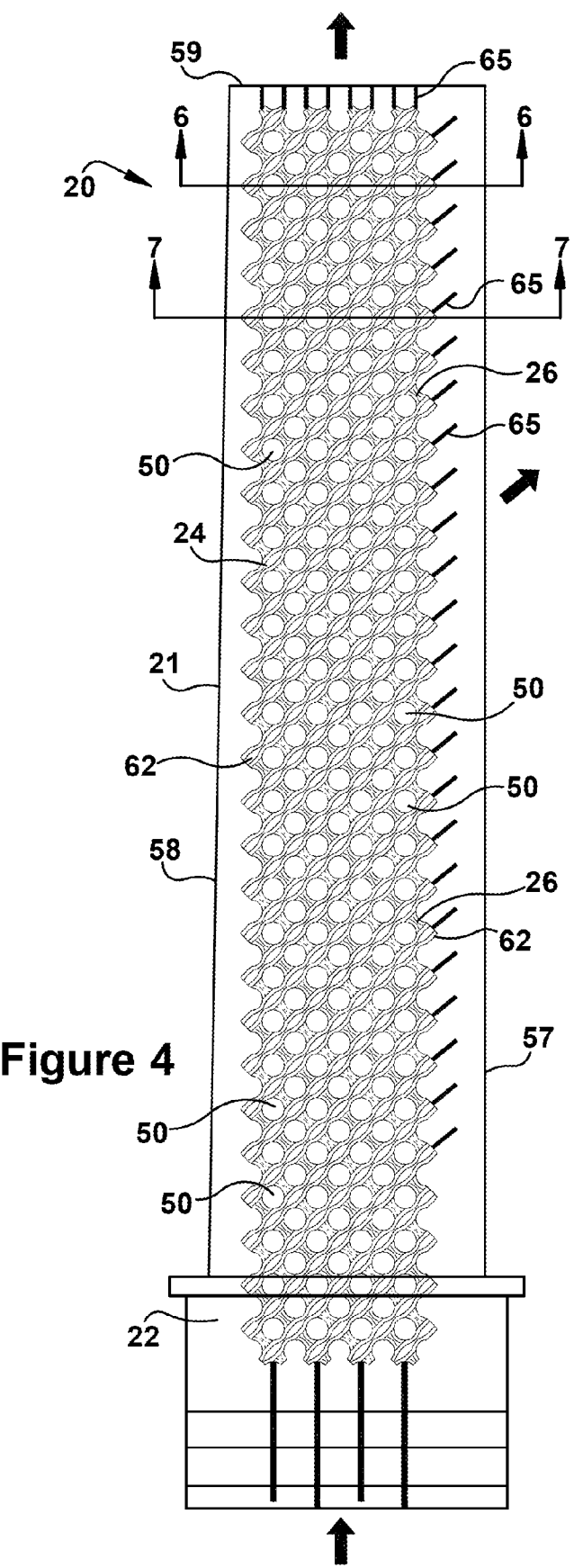
FIG. 4 is a side view of a turbine rotor blade with a cutaway showing cooling channels with a configuration according to an embodiment of the present invention.

It will be appreciated that embodiments of the present invention may be used to cool relatively thin walls within turbine blades. In some embodiments, as stated, the present invention may be used to cool the pressure side and the suction side of a turbine blade, particularly turbine blades having a narrow or thin aerodynamic shape. In such embodiments, the first set of cooling channels 24 and second set of cooling channels 26 may be configured such that much of or virtually all the entire outer surface of the turbine blade 20 is cooled by the interior cooling channels 24, 26. That is, in some embodiments, the first set of cooling channels 24 and the second set of cooling channels 26 extend, at least, from a position near the trailing edge 57 to a position near the leading edge 58 of the airfoil 21; and, at least, from a position near a shank 22 to a position near an outer radial tip 59 of the airfoil 22, as generally shown in FIG. 4.

It will be appreciated that, given the configuration of the cooling channels 24, 26 as described above, a plurality of redirection points 62 are formed near the axial extremities of the field of cooling channels 24, 26. As shown in FIG. 4, in one embodiment, the axial extremities of the field of cooling channels includes a position near the trailing edge 57 of the airfoil 21 and a position near the leading edge 58 of the airfoil 21. It will be appreciated that other arrangements are possible. The redirection point 62 generally comprises a junction where a cooling channel from either the first set of cooling channels 24 or second set of cooling channels 26 terminates and a cooling channel from the other set begins. At the redirection point 62, a chamber section 30 from the first set of cooling channels 24 and a chamber 30 from the second set of cooling channels 26 form a junction or make a connection. That is, at a redirection point 62, the two chambers 30 from each of the sets of cooling channels 24, 26 open to each other and are in flow communication with each other. In this manner, coolant may flow through a cooling channel from one set of cooling channels until reaching a termination point at the redirection point 62, and then, the coolant may switch flow planes by flowing into a chamber 30 within the other set of cooling channels. Switching planes in this fashion, the coolant may "zig-zag" its way toward an outlet.

In some embodiments, at the redirection points 62, a coolant outlet 65 may be formed. Coolant outlets 65, as used herein, are outlets or apertures along the surface of the turbine blade 20 that connect to the cooling channels 24, 26. Coolant outlets 65 provide an outlet through which coolant may exit the cooling channels 24, 26. As shown, the coolant outlets 65 may be positioned near the trailing edge 57 of the airfoil 21. Coolant outlets 65 may be positioned in other areas of the airfoil 21, such as the leading edge 58, as shown in FIG. 8, as well as along the pressure side of the turbine blade 20, as shown in FIG. 11. Coolant outlets 65 may be configured and positioned to provide film cooling to critical areas. In some embodiments, the coolant outlets may be metered such that a desired level of coolant is emitted during engine operation. The metering generally is done to ensure that adequate pressure remains in the flow of coolant through the interior cooling channels 24, 26 to drive coolant along the entire length of the airfoil 21.

The first set of cooling channels 24 and the second set of cooling channels 26 may be supplied coolant through one or more inlets that are configured to receive a flow of coolant from channels formed within in the shank 22. As stated, per conventional means, coolant in the form of compressed air may be bled from the compressor 11 and supplied through the turbine 12 to a predetermined location such that it may be fed through the shank 22 to the cooling channels. Coolant outlets 65 also may be formed near the outer radial tip 59 of the airfoil 21. These outlets 65 also may be metered such that a desired amount of coolant is released through them.

In operation, cooling channels 24, 26 in accordance with the present application offer enhanced performance, particularly for aggressively shaped, thinner aerodynamic blade configurations. As shown, the cooling channels 24, 26 may offer coverage for the entire airfoil 21 of the turbine blade 20. Further, the present cooling channels 24, 26 promote a lighter blade by removing significant amounts of material. However, given the configuration of the cooling channels 24, 26, the blades remain robust and strong. In particular, the curved contours and rounded solid regions dissipate stress concentrations, while maintaining a firm, strong structure.

In addition, the cooling channels 24, 26 promote efficient and effective cooling. First, the converging-diverging configuration creates turbulent flow through the cooling channels 24, 26. In particularly, the velocity of the coolant is repeatedly increased and decreased as it passes through the sections of varying cross-sectional size (i.e., the chamber section 30 and the throat section 32). It will be appreciated that turbulent flow increases the cooling effectiveness of the coolant.

Second, the connections made between adjacent chamber sections 30 in the two sets of cooling channels 24, 26 further induces turbulent flow and, thereby, increases cooling effectiveness. It will be appreciated that adjacent chamber sections 30 (i.e., a chamber section 30 in the first set of cooling channels 24 that is adjacent to a chamber section 30 in the second set of cooling channels 26) each will have coolant that has a radial flow component; however, in terms of axial flow component, the coolant in one chamber section 30 will have an upstream axial flow component while the coolant in the other has a downstream axial flow component. The connections made between the adjacent chambers will promote a certain level of mixing, which, given the differing axial flow components of the two flows, will induce turbulent mixing and/or a vortex flow pattern within each of the chamber sections. The resulting interruption of any formed boundary layers by this turbulent mixing/vortex flow pattern will promote greater cooling efficiency.

Figure 16:
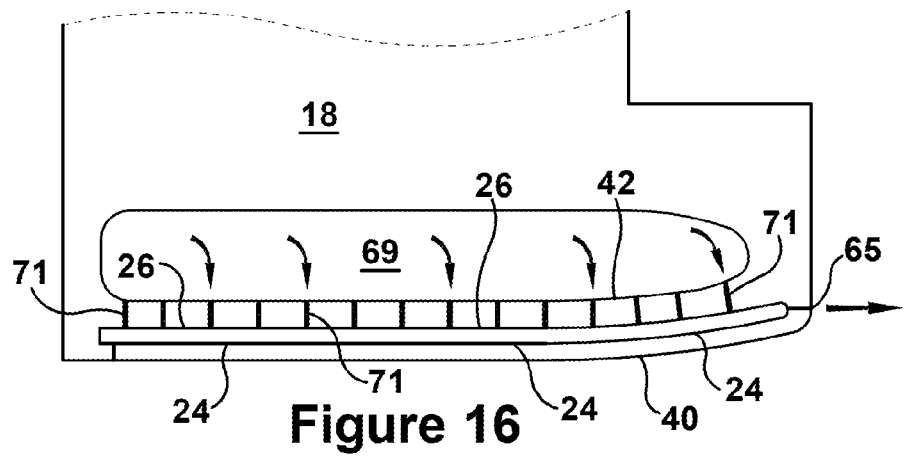
FIG. 16 is a profile view of cooling channels according to an embodiment of the present application as the cooling channels might be positioned in usage within a stationary shroud of a combustion turbine engine.

FIGS. 16 through 19 illustrate alternative applications for the cooling channels 24, 26. FIG. 16 is a profile view of cooling channels 24, 26 according to an embodiment of the present application as the cooling channels might be positioned in usage within a stationary shroud 18 of a combustion turbine engine. In this type of application, coolant from a coolant chamber 69 may flow through supply channels 71 to cooling channels 24, 25 that are located between the coolant chamber 69 and an outer surface of the stationary shroud 18 that is exposed to the hot gas flow of the engine. Accordingly, in this application, the first surface 40 may be the outer surface of the stationary shroud 18 and the second surface may be the surface of the coolant chamber 69.

FIG. 17 is a profile view of cooling channels 24, 26 according to an embodiment of the present application as the cooling channels 24, 26 might be positioned in usage within the trailing edge of stator blade 17 of a combustion turbine engine. FIG. 18 is a side view of the cooling channels of FIG. 17. The cooling channels 24, 26 of the present invention generally are well suited to this type of application because of the narrowness of the trailing edge. As indicated, the coolant may enter the cooling channels 24, 25 through a hollow chamber 73 and exit through the trailing edge of the blade. In this application, it will be appreciated that the first surface 40 is the pressure side of the aft portion of the stator blade 17 and the second surface is the suction side of the aft portion of the stator blade 17.

FIG. 19 is a profile view of cooling channels 24, 26 according to an embodiment of the present application as the cooling channels might be positioned in usage within the sidewalls of a hollow turbine stator blade 17. As indicated, the cooling channels 24, 26 may be separated into several sections along the circumference of the stator blade 17, each of which is independently supplied with coolant. Though not illustrated, it will be appreciated that this type of configuration also may be applied to turbine rotor blades 16.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. Cooling channels through the interior of a machine component, the cooling channels comprising:
 a first set of cooling channels, the first set of cooling channels including a plurality of parallel channels that reside in a first plane;
 a second set of cooling channels, the second set of cooling channels including a plurality of parallel channels that reside in a second plane;
 wherein:
 along a longitudinal axis, the cooling channels of the first and second set of cooling channels comprise an alternating diverging-converging configuration, the alternating diverging-converging configuration creating a series of broader chamber sections connected by a series of narrower throat sections;
 the first set of cooling channels and the second set of cooling channels are configured such that, when viewed from the side, a crisscrossing pattern with a plurality of intersections is formed;
 the first plane resides in spaced relation to the second plane, with the first plane being offset from the second plane such that a plurality of the chamber sections of the first set of cooling channels connect to a plurality of the chamber sections of the second set of cooling channels;
 the machine component comprises a component within a combustion turbine engine including one of: a turbine rotor blade; a turbine stator blade; a stationary shroud; a combustor liner; and a combustor transition piece;
 the chamber sections comprise channels of greater average cross-sectional area than the throat sections;
 the throat sections comprise a converging section that narrows to a minimum throat area followed by a diverging section that broadens from the minimum throat area;
 the chamber sections comprise a diverging section that broadens to a maximum chamber area followed by a converging section that narrows from the maximum chamber area; and
 the throat sections and the chamber sections comprise a smooth, curved contour.

2. The cooling channels according to claim 1, wherein the alternating diverging-converging configuration of the first set of cooling channels comprises a regular spacing between the chamber sections and the throat sections; and wherein the alternating diverging-converging configuration of the second set of cooling channels comprises a regular spacing between the chamber sections and the throat sections; and wherein the regular spacing for the first set of cooling channels and the regular spacing for the second set of cooling channels is approximately the same; and
 wherein the first set of cooling channels and the second set of cooling channels are configured such that, when viewed from the side, the chamber sections of the first set of cooling channels overlap the chamber sections of the section set of cooling channels to form the plurality of intersections.

3. The cooling channels according to claim 2, wherein the first set of cooling channels resides in close proximity to a first surface of the turbine blade; and the second set of cooling channels resides in close proximity to a second surface of the turbine blade; and
 wherein the first plane resides in spaced relation to the first surface of the turbine blade and the second plane resides in spaced relation to the second surface of the turbine blade.

4. The cooling channels according to claim 3, wherein the first set of cooling channels comprises an exterior side that is directed toward the first surface and an interior side that is directed toward the second set of cooling channels;
 wherein the second set of cooling channels comprises an exterior side that is directed toward the second surface and an interior side that is directed toward the first set of cooling channels; and
 wherein the chamber sections of the first set of cooling channels connect to the chamber sections of the second set of cooling channels along the interior sides of the chamber sections of the first set of cooling channels and the interior sides of the chamber sections of the second set of cooling channels.

5. The cooling channels according to claim 3, wherein the first surface comprises a pressure side of the turbine blade; and the second surface comprises a suction side of the turbine blade.

6. The cooling channels according to claim 3, wherein the turbine blade comprises a hollow chamber; and wherein the first surface comprises an exterior surface of the turbine blade and the second surface comprises an interior surface of the turbine blade along the hollow chamber.

7. The cooling channels according to claim 1, wherein the minimum throat area and the maximum chamber area are configured such that a cross-sectional area of the minimum throat area comprises a range of between about 0.8 to 0.2 of a cross-sectional area of the maximum chamber area.

8. The cooling channels according to claim 1, wherein the minimum throat area and the maximum chamber area are configured such that a cross-sectional area of the minimum throat area comprises a range of between about 0.6 to 0.4 of a cross-sectional area of the maximum chamber area.

9. The cooling channels according to claim 1, wherein the crisscrossing pattern of the first and second set of cooling channels is configured such that solid regions are formed between groups of surrounding intersections, the solid regions comprising a region of solid material around which the first set of cooling channels and the second set of cooling channels are formed; and
wherein, the solid regions, when viewed from the side, comprise an approximately circular, oval or elliptical shape and the groups of surrounding intersections comprises a group of four neighboring intersections.

10. The cooling channels according to claim 9, wherein the approximate circular, oval or elliptical shape of the solid region forms the contour of the converging sections and the diverging sections of the throat sections that connect the chamber sections of the group of surrounding intersections.

11. The cooling channels according to claim 1, wherein the first set of cooling channels are disposed at a first angle with respect to a blade span reference line and the second set of cooling channels are disposed at a second angle with respect to the blade span reference line so as to form the crisscrossing pattern; and
wherein the cooling channels of the first set of cooling channels and second set of cooling channels are configured to pass a coolant through the turbine blade.

12. The cooling channels according to claim 11, wherein:
the first angle has a range from about 25 degrees to about 65 degrees, and the second angle has a range from about −25 to about −65 degrees; or
the first angle has a range from about −25 degrees to about −65 degrees, and the second angle has a range from about 25 to about 65 degrees.

13. The cooling channels according to claim 11, wherein:
the first angle has a range from about 35 degrees to about 55 degrees, and the second angle has a range from about −35 to about −55 degrees; or
the first angle has a range from about −35 degrees to about −55 degrees, and the second angle has a range from about 35 to about 55 degrees.

14. The cooling channels according to claim 11, wherein the first angle has a value of about 45 degrees and the second angle has a value of about −45 degrees; or wherein the first angle has a value of about −45 degrees and the second angle has a value of about 45 degrees.

15. The cooling channels according to claim 1, wherein:
at the first set of cooling channels and the second set of cooling channels comprise an upstream axial boundary and a downstream axial boundary;
the first set of cooling channels and second set of cooling channels comprise redirection points at the upstream axial boundary and the downstream axial boundary;
each of the redirection points comprises a junction between a chamber section from the first set of cooling channels and a chamber section from the second set of cooling channels, and wherein, at each of the redirection points, one of the chamber sections from the first set of cooling channels and one of the chamber sections from the second set of cooling channels are in flow communication with each other; and
each of the redirection points comprises a junction at which a cooling channel from either the first set of cooling channels or the second set of cooling channels ends and a cooling channel from the other set begins.

16. The cooling channels according to claim 15, wherein the turbine blade comprises a turbine rotor blade;
wherein the upstream axial boundary comprises a position near a leading edge of an airfoil of the turbine rotor blade and the downstream axial boundary comprises a position near a trailing edge of the airfoil of the turbine rotor blade.

17. The cooling channels according to claim 16, wherein at a position near a shank portion of the turbine rotor blade, the cooling channels from the first set of cooling channels and second set of cooling channels comprise inlets that are configured to accept a flow of coolant from a supply feed formed through the shank portion; and
wherein at a position near an outer radial tip of the turbine rotor blade, the cooling channels of the first set of cooling channels and second set of cooling channels comprise coolant outlets, the coolant outlet being metered such that a desired level of coolant is emitted during operation.

18. The cooling channels according to claim 15, wherein a plurality of the redirection points comprises a coolant outlet, the coolant outlet being metered such that a desired level of coolant is emitted therefrom during operation.

19. The cooling channels according to claim 15, wherein a width of the profile of the first set of cooling channels and the second set of cooling channels narrows as the first set of cooling channels and the second set of cooling channel extend in an outward radial direction; and wherein the narrowing is in approximate proportion to a narrowing of the turbine rotor blade.

20. The cooling channels according to claim 1, wherein the first set of cooling channels comprises cooling channels that extend diagonally from an inner radial/leading edge position to an outer radial/trailing edge position; and the second set of cooling channels comprises cooling channels that extend diagonally from an inner radial/trailing edge position to an outer radial/leading edge position; and wherein longitudinal axes of the first set of cooling channels are approximately perpendicular to longitudinal axes of the second set of cooling channels; and
wherein the first plane and the second plane comprise an offset that, in operation, promotes a desired level of mixing at the connections formed between the chamber sections of the first set of cooling channels and the chamber sections of the second set of cooling channels.

21. Cooling channels through the interior of a machine component, the cooling channels comprising:
a first set of cooling channels, the first set of cooling channels including a plurality of parallel channels that reside in a first plane;

a second set of cooling channels, the second set of cooling channels including a plurality of parallel channels that reside in a second plane;

wherein:
- along a longitudinal axis, the cooling channels of the first and second set of cooling channels comprise an alternating diverging-converging configuration, the alternating diverging-converging configuration creating a series of broader chamber sections connected by a series of narrower throat sections;
- the first set of cooling channels and the second set of cooling channels are configured such that, when viewed from the side, a crisscrossing pattern with a plurality of intersections is formed;
- the first plane resides in spaced relation to the second plane, with the first plane being offset from the second plane such that a plurality of the chamber sections of the first set of cooling channels connect to a plurality of the chamber sections of the second set of cooling channels;
- at the first set of cooling channels and the second set of cooling channels comprise an upstream axial boundary and a downstream axial boundary;
- the first set of cooling channels and second set of cooling channels comprise redirection points at the upstream axial boundary and the downstream axial boundary;
- each of the redirection points comprises a junction between a chamber section from the first set of cooling channels and a chamber section from the second set of cooling channels, and wherein, at each of the redirection points, one of the chamber sections from the first set of cooling channels and one of the chamber sections from the second set of cooling channels are in flow communication with each other; and
- each of the redirection points comprises a junction at which a cooling channel from either the first set of cooling channels or the second set of cooling channels ends and a cooling channel from the other set begins.

\* \* \* \* \*